United States Patent [19]

Blakeslee et al.

[11] Patent Number: 5,479,909
[45] Date of Patent: Jan. 2, 1996

[54] SNOWMOBILE WITH CONTROL SYSTEM FOR ACTIVATING ELECTRONIC FUEL INJECTION

[75] Inventors: Wes Blakeslee, Badger; Ian Hart, Greenbush, both of Minn.

[73] Assignee: Polaris Industries L.P., Minneapolis, Minn.

[21] Appl. No.: 408,335

[22] Filed: Mar. 22, 1995

Related U.S. Application Data

[63] Continuation of Ser. No. 61,716, May 12, 1993, abandoned.
[51] Int. Cl.⁶ .................................... F02D 41/06
[52] U.S. Cl. .................. 123/491; 123/179.1; 123/599
[58] Field of Search .......................... 123/179.16, 149 A, 123/149 C, 149 D, 598, 599, 478, 491, 497, 632, 630, 198 R, 480, 179.1

[56] References Cited

U.S. PATENT DOCUMENTS

| | | | |
|---|---|---|---|
| 4,791,905 | 12/1988 | Furuta et al. | 123/497 |
| 4,901,701 | 2/1990 | Chasteen | 123/478 |
| 4,967,712 | 11/1990 | Chasteen | 123/478 |
| 5,024,205 | 6/1991 | Gatza et al. | 123/632 |
| 5,048,503 | 9/1991 | Suzuki et al. | 123/632 |
| 5,172,675 | 12/1992 | Kurosu et al. | 123/149 A |
| 5,199,394 | 4/1993 | Hartmann et al. | 123/179.1 |

OTHER PUBLICATIONS

Dealer Meeting Handout entitled "Planned 92 Polaris Snowmobile Improvements as of Mar. 8, 1991".
Dealer Meeting Handout entitled "Tentative 93 Model Polaris Snowmobile Improvements as of Mar. 2, 1992".

*Primary Examiner*—Willis R. Wolfe, Jr.
*Attorney, Agent, or Firm*—Fredrikson & Byron

[57] ABSTRACT

An electronically controlled fuel injection system for a snowmobile engine utilizing a battery with the fuel injection system having an electronic control unit connected to the battery for operating the system. The engine has an alternator provided for producing an electrical output in response to rotation of the engine. A control switching means is provided for selectively supplying electrical energy to the battery and the control unit upon detecting electrical current from the alternator so that power is supplied to the electronic control unit whenever the engine is in a starting operation either by a rope pull starter or by activating an electric starter.

12 Claims, 4 Drawing Sheets

SNOWMOBILE WITH CONTROL SYSTEM FOR ACTIVATING ELECTRONIC FUEL INJECTION

This application is a continuation, of application Ser. No. 08/061716, filed May 12, 1993, now abandoned.

FIELD OF THE INVENTION

The present invention relates to internal combustion engines containing fuel injection systems and electrical control units and in particular, to a means of preventing unintentional drainage of the battery in a snowmobile engine.

BACKGROUND OF THE INVENTION

In recent years, snowmobiles, particularly high performance snowmobiles, have been provided with fuel injection systems. Typically, the fuel injection systems are electronic in nature and similar to the electronic fuel injection systems that are common in four-cycle engines. The electronic control unit (ECU) of the fuel injection system employs a collection of sensors to measure a variety of parameters relating to engine condition and operation such as engine speed, throttle position, engine temperature and barometric pressure. By monitoring these (and other) engine parameters, the ECU is capable of directing the fuel injection system to deliver the amount of fuel and air mixture necessary for the desired performance characteristics of the engine.

To operate a snowmobile, the rider will turn the ignition switch to the "run" position, typically through the use of a key, to engage the ignition system. The ignition switch can also be turned to the "off" position, thereby incapacitating the ignition system and stopping the engine. Snowmobiles, however, also typically include an emergency stop or kill switch that, when activated by the rider, will interrupt the ignition system, thereby causing the engine to stop.

Although primarily designed for emergency uses, riders will frequently use the emergency stop switch as a means of regularly stopping their snowmobiles. Snowmobile riders thus are also in the habit of leaving the ignition switch in the "run" position when the machine is stopped, and some also return the emergency stop switch to the "run" position after using it to stop the machine. Stopping a snowmobile via the emergency stop switch, however, does not necessarily disengage the ECU from the battery if the ECU is powered from the contacts on the ignition stop switches. Thus, the ECU may continue to draw power from the battery after the engine has been shut down. If the snowmobile is left for an extended period of time with the ignition switch in the "run" position, there is a possibility of the battery being drained to a point where there will be insufficient power to reactivate the electrical components of the snowmobile and the rider will then be stranded.

Prior art solutions to the problem of battery drainage have involved supplying the electrical components of the engine with a momentary pulse of power when the rider activates a switch. In such systems, the power is maintained after the switch activation through the use of a relay or solid state switch so that the ECU can shut itself off once it detects that the engine has been inactive for set period of time. An example of such a system is U.S. Pat. No. 5,024,205 by W. Gatza and R. Chasteen.

The prior art solutions, however, suffer from significant disadvantages. One disadvantage is that positioning the ignition and emergency stop switches in their "run" positions will not necessarily result in the machine being ready for starting. This is counter to the expectations of most snowmobile riders and thus can become a nuisance or a source of confusion to the snowmobile operator. In some variations, the rider must turn the ignition switch beyond the "run" position to a spring-loaded "start" position to provide the initial power pulse. This is an undesired requirement unless the snowmobile possesses an electric starter.

Another prior an variation includes a circuit that produces the momentary pulse of power when it is first fed with continuous power from the ignition switch upon the ignition switch being turned to the "run" position.

All of these prior art variations, however, suffer from the additional disadvantage that after the operator-required action is performed to prepare the snowmobile for operation, the snowmobile will eventually cease to be ready to start if the engine is not started within some period of time thereafter. The readying action will then have to be performed once again. This necessitates the inclusion of an indicator, such as a lamp, to communicate when the system is ready for operation. The rider will then have monitor the indicator in addition to possibly being required to perform further positioning of the ignition switch.

A need exists, therefore, for a snowmobile electrical system that is operational whenever the ignition and emergency stop switches are located in their "run" positions, but that will prevent significant battery discharge when these switches are left in the "run" position after the engine has been turned off.

SUMMARY OF THE INVENTION

The present invention relates to a snowmobile having an engine control system capable of preventing the discharge of the battery when the ignition switch and/or emergency stop switch is set in the "run" position and the engine is turned off. The invention is particularly applicable for snowmobiles with two-cycle engines and electronic fuel injection systems regulated by an electronic control unit.

The engine control system of the present invention is appropriate for internal combustion engines having a battery, an ignition system including an alternator connected to the crankshaft of the engine, a fuel injection system including a fuel tank, fuel pump and at least one injector and an electronic control unit for controlling the fuel injection system.

For the present invention, an alternator controlled switch (ACS) is electronically connected between the battery and the electronic control unit. The ACS is activated by the alternator output produced by engine rotation. When activated, the ACS effects the connection of the power from the battery to the electronic control unit. When the engine is not running, no output is produced by the alternator, the ACS is inactive and the electronic control unit does not draw power from the battery, even if the ignition switch or emergency stop switch are located in the "run" position.

The use of the ACS to effect the connection between the battery and the electronic control unit eliminates the need for superfluous operator actions to ready the snowmobile for use once the ignition switch is set to "run", and reliably and automatically connects the battery to the electronic control unit whenever the operator attempts to start the engine, whether by manually pulling the starter rope or by activating an electric starter.

DETAILED DESCRIPTION OF THE INVENTION

Figure 1:
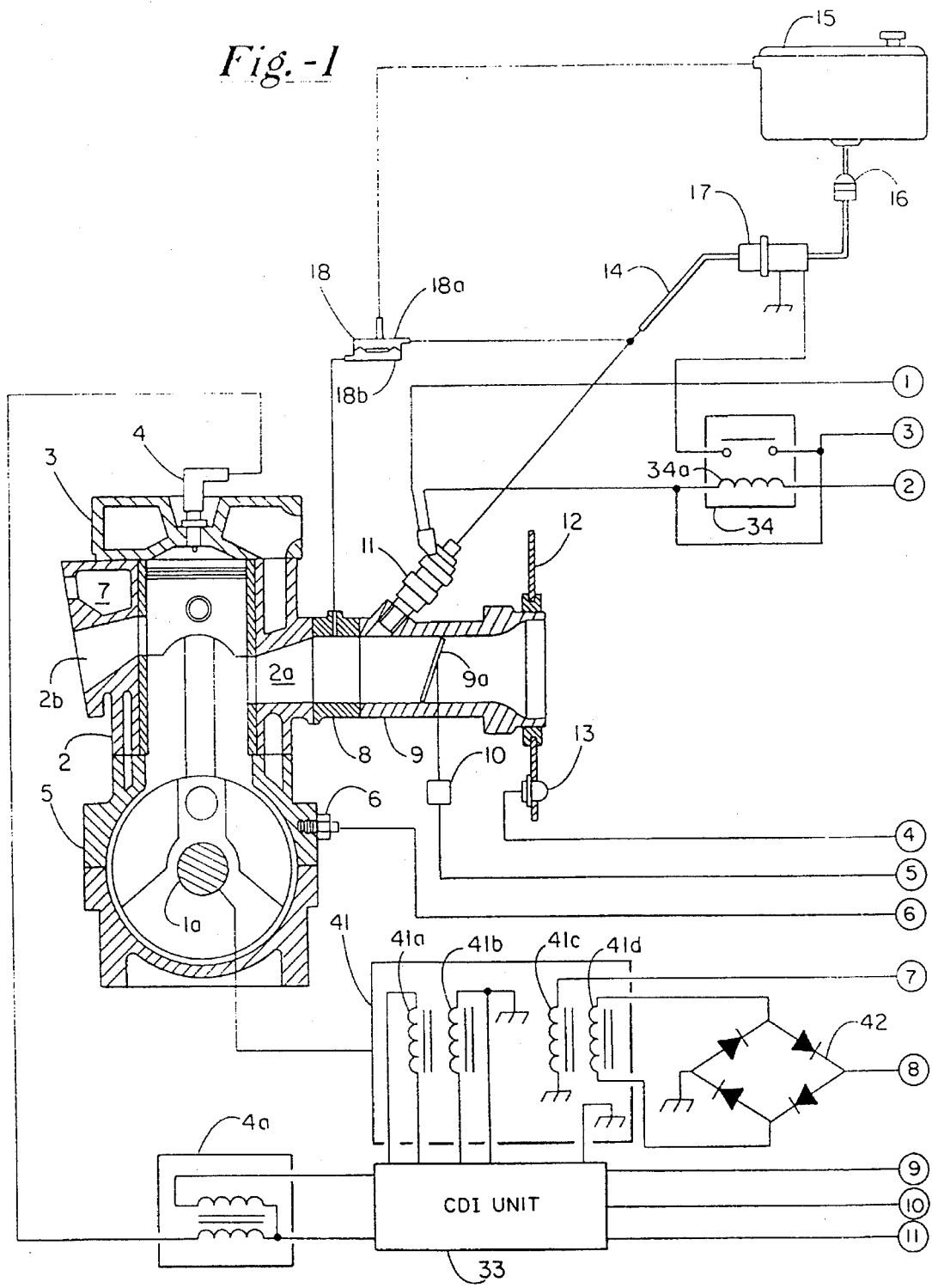
FIG. 1 is a schematic diagram of a conventional control system for an engine including a fuel injector, fuel tank, alternator and capacitive discharge ignition unit.
Figure 2:
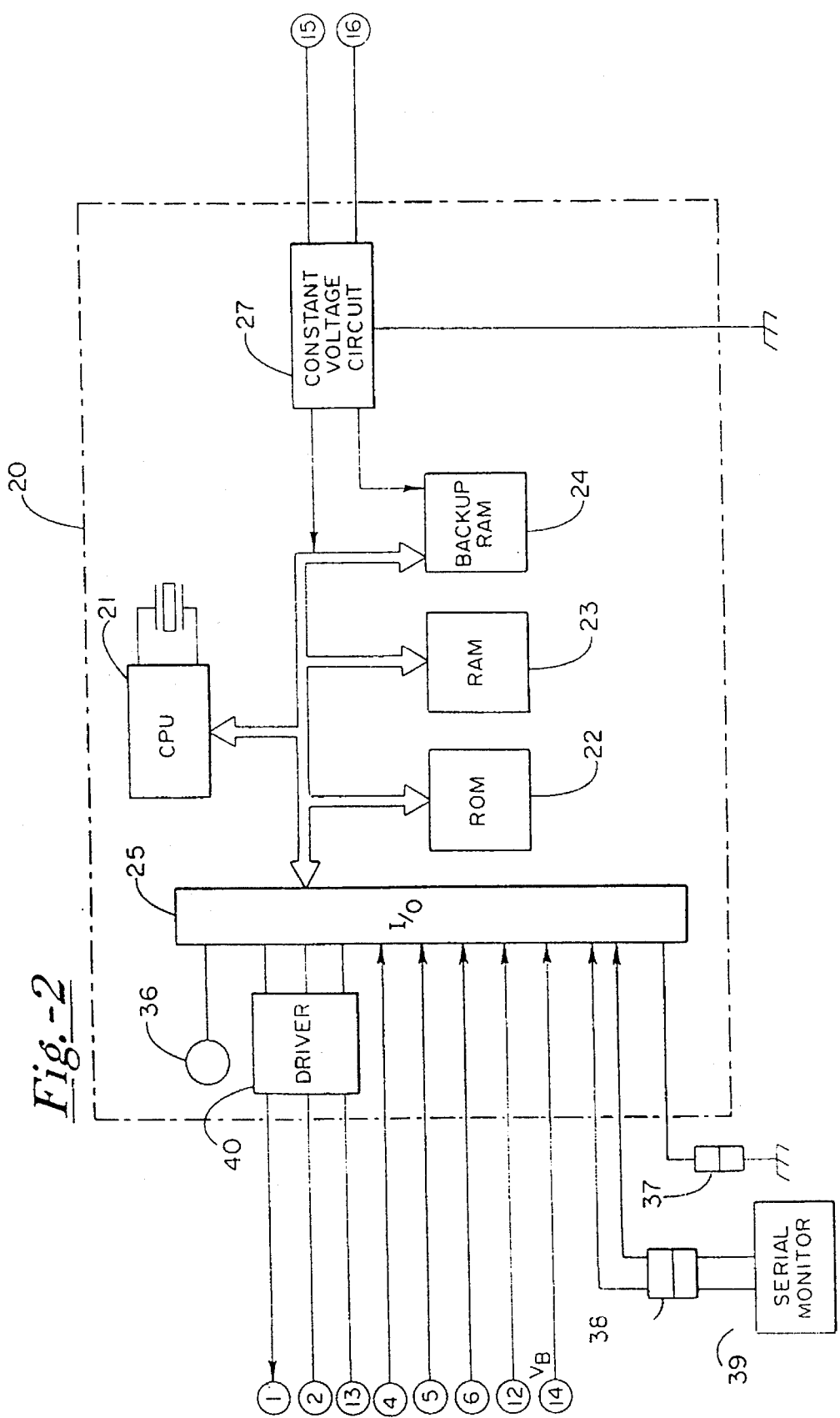
FIG. 2 is a schematic diagram of a conventional electrical control unit for an engine.
Figure 3:
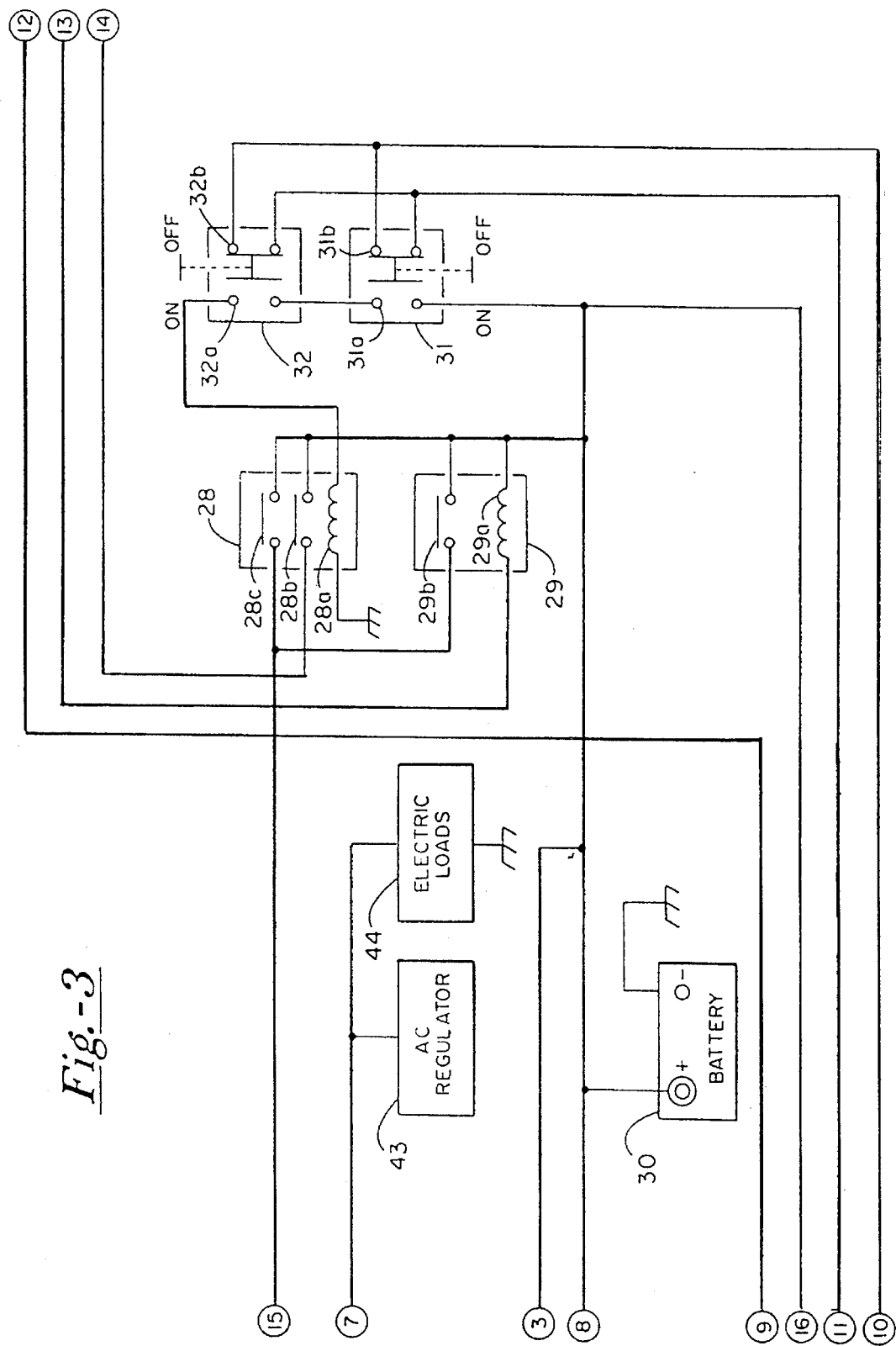
FIG. 3 is a schematic diagram of a conventional control system circuit for an engine.
Figure 4:
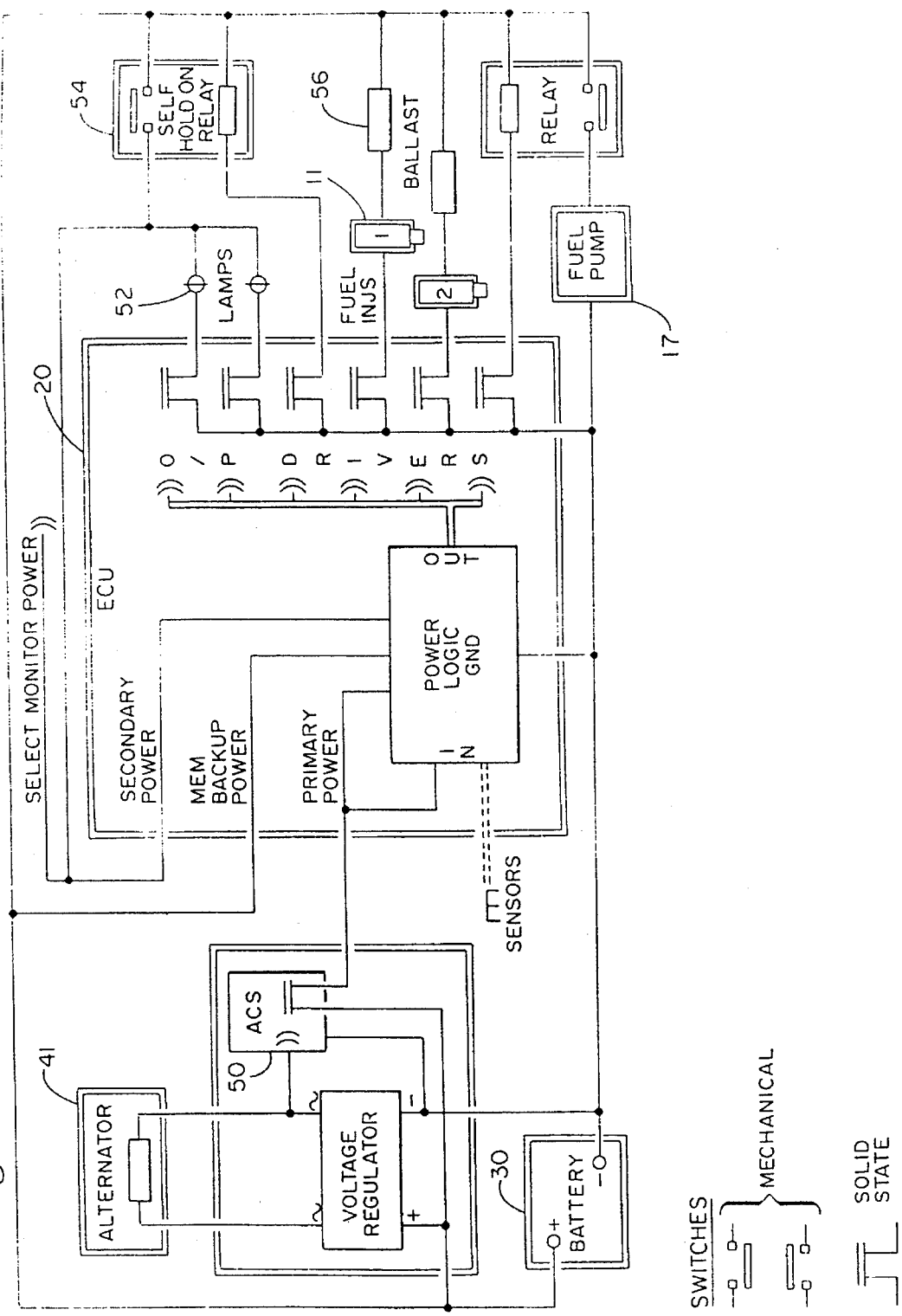
FIG. 4 is a schematic diagram of a electrical control system for the present invention.

As can be seen in FIGS. 1–4, the present invention concerns a snowmobile engine with an electric fuel injection system. The engine includes an ignition system, a battery, a fuel injection system and an electronic control unit. Fuel injection systems and control circuits for snowmobiles are known in the art. Examples of such systems include U.S. Pat. No. 5,090,386 by Mitsugi et al., U.S. Pat. No. 5,050,564 by Mitsugi et al. and U.S. Pat. No. 5,048,503 by K. Suzuki and Y. Yurzuriha, all of which are herein incorporated by reference.

Referring to the Figures, a two-cycle engine 1 for a snowmobile is shown wherein the engine includes a cylinder 2 of the engine 1 having an intake port 2a and an exhaust port 2b. A spark plug 4 is located in each combustion chamber formed in a cylinder head 3. A crankcase temperature sensor 6 is provided in a crankcase 5. Water jackets 7 are provided in the crankcase 5, cylinder 2 and the cylinder head 3. The intake port 2a is in communication with an intake manifold 9 through an insulator 8. A throttle valve 9a is provided in the intake manifold 9. A throttle position sensor 10 is attached to the intake manifold 9. A fuel injector 11 is provided in the intake manifold 9 adjacent to the intake port 2a. The intake manifold 9 is in communication with an air box 12 having an air cleaner (not shown). An intake air temperature sensor 13 is mounted on the air box 12.

Fuel in a fuel tank 15 is supplied to the injector 11 through a fuel passage 14 having a filter 16 and a pump 17. The fuel injector 11 is in communication with a fuel chamber 18a of a pressure regulator 18 and the fuel tank 15 is in communication with an outlet of the fuel chamber 18a. A pressure regulating chamber 18b is in communication with the intake manifold 9.

The fuel in the tank 15 is supplied to the fuel injector 11 and the pressure regulator 18 by the pump 17 through the filter 16. A difference between an inner pressure of the intake manifold 9 and a fuel pressure applied to the injector 11 is maintained at a predetermined value by the pressure regulator 18 so as to prevent the fuel injection quantity of the injector 11 from changing.

The ignition system includes an alternator 41 for generating alternating current that may be of the conventional type utilizing a magnet and wound wires or may be of any other useful type known in the art. In the preferred embodiment, an alternator with a permanent magnet is used so that the alternator will produce power when the engine is running but not consume power when the engine is not running. The alternator is connected to a crankshaft of the engine and preferably includes a stator divided primarily into an exciter coil 41a, a source coil 41c and a charge coil 41d.

The source coil 41c is connected to an AC regulator 43, so that the voltage is regulated, and the regulated voltage is applied to power various electric loads 44 of the vehicle such as lamps, a heater, headlights, tail lights, a speedometer, tachometer and other various accessories. The regulated output of the alternator is independently supplied to the electric loads.

The power from the battery 30 is supplied to the electric loads of the system such as the injector 11, pump 17, control unit 20, and coils 28a, 29a, and 34a of the relays 28, 29 and 34. During engine operation, the alternating current from the charge coil 41d is rectified by the rectifier 42 to charge the battery 30. In the preferred embodiment, the rectifier 42 is incorporated into the alternator controlled switch (described below). Also in the preferred embodiment, the relay 28 is replaced by a pair of diodes located between the self-hold-on relay 54 and the primary power. Among other purposes, the diodes are capable of providing a signal to the electronic control unit that the engine has stopped running so that it can begin its time out function.

The electric loads such as the lamps, heater and other various accessories of the vehicle consume a large amount of electric power. Moreover, power consumption of the snowmobile is dependent upon the weather conditions and thus will exhibit changes.

In accordance with the present invention, the alternator 41 for the ignition system has one charge coil 41d to charge the battery 30 and another source coil 41c to supply the power to the electric loads, however the system can operate with a variety of permutations of coils and both a charge coil and source coil are required. Stable power is supplied to the system without being effected by power changes caused by the other electric loads. The system, therefore, operates accurately and the charging of the battery 30 is properly controlled.

In the preferred embodiment, the exciter coil 41a provides the electrical current necessary to enable the spark plugs 4 in the ignition system to operate. The exciter coil 41a is connected to a capacitive discharge ignition unit 33 of a type known in the art. The capacitive discharge ignition unit 33 desirably includes at least one high voltage capacitor designed to retain an electrical charge.

In the preferred embodiment, the capacitive discharge ignition unit 33 further includes a plurality of rectifier diodes and a silicon controlled rectifier. The capacitive discharge ignition unit 33 is connected to the exciter coil 41a through appropriate leads and is triggered by the electronic control unit 20 (described below) or by an additional coil in the alternator called a pulser coil 41b. The pulser coil 41b may be energized by the movement of magnets in the alternator 41 after the capacitor is charged by the exciter coil 41a. When energized, current flows from the pulser coil 41b through the rectifier diode into the gate terminal of the silicon controlled rectifier. This causes the silicon controlled rectifier to switch on and deliver a current pulse from the capacitor to the primary winding of a double ended ignition coil.

The capacitive discharge ignition unit 33 is electrically connected to an ignition coil 4a of a type known in the art. The ignition coil 4a receives electrical current from the capacitive discharge ignition unit 33 and steps the voltage up to a level sufficient to enable the spark plugs 4 to properly fire.

An electronic control unit (ECU) 20 having a microcomputer comprises a central processing unit (CPU) 21, a ROM 22, a RAM 23, a backup RAM 24 and an input-output interface 25, which are connected to each other through a bus line 26. The ECU 20 monitors a number of sensors relating to the operating parameters of the engine. The ECU 20 is then capable of directing the fuel injection system to deliver the amount of fuel and air mixture necessary for the efficient operation of the engine.

ECU's are known in the art and any appropriate system can be used with the present invention. An example of an ECU for use with a snowmobile is that described in U.S. Pat. No. 5,024,205 by W. K. Gatza and R. E. Chasteen, and U.S. Pat. No. 5,172,675 by S. Kurosu and I. Hart, both of which are herein incorporated by reference.

A predetermined voltage is supplied from a constant voltage circuit 27. The constant voltage circuit 27 is connected to a battery 30 through a contact 28b of an ECU relay 28 and a contact 29b of a self-shut relay 29 which are connected with each other in parallel. Furthermore, the battery 30 is directly connected to the constant voltage circuit 27 so that the backup RAM 24 is backed up by the battery 30 so as to maintain stored data even if an ignition or key switch (not shown) is in the "off" state.

Sensors 6, 10 and 13 are connected to input ports of the input/output interface 25. An atmospheric pressure sensor 36 is provided in the control unit 20 and connected to an input port of the input/output interface 25. Output ports of the interface are connected to a driver 40 which is connected to injectors 11 and a coil 34a of a relay 34 for the pump 17. The injectors 11 can also be electrically connected to ballast or dropping resistors 56.

If desired, the ECU relay 28 has a pair of contacts 28b, 28c and an electromagnetic coil 28a. As described, the contact 28b is connected to the constant voltage circuit 27 and the battery 30. The other contact 28c is connected to the input port of the input/output interface 25 and the battery 30 for monitoring a voltage of the battery 30. The system can also include lamps 52 such as a battery charge indicator and an engine temperature gauge.

As mentioned, the electrical system of the vehicle also desirably includes an emergency stop or kill switch 32 and a multi-purpose ignition or key switch 31 of conventional design. The ignition switch 31 activates or incapacitates the ignition system and provides power to the electrical system, while the emergency stop switch 32 is preferably located on the handle of the vehicle and acts as a safeguard to stop the engine. If desired, the coil 28a of the relay 28 can be connected to the battery 30 through ON-terminals 31a, 32a of the emergency stop switch 32 and the ignition switch 31. In the preferred embodiment, the ON/OFF terminals are replaced by the alternator controlled switch 50.

The ON-terminals 31a, 32a of the ignition switch 31 and the emergency stop switch 32 are connected to each other in series and the OFF-terminals 31a, 32a of the switches and connected to each other in parallel. When both of the switches 31, 32 are turned on, power from the battery 30 is supplied to the coil 28d of the relay 28 to excite the coil 28d to close each contact. Thus, the power from the battery 30 is supplied to the constant voltage circuit 27 through the contact 28b for controlling the control unit 20.

The self-shut relay 29 has the contact 29b connected to the constant voltage circuit 27 and the battery 30 and a coil 29a connected to the output port of the input/output interface 25 through the driver 40 and the battery 30.

When the emergency stop switch 32 is activated, the electrical circuit between the capacitive discharge ignition unit 33 and the charge coil 41d of the alternator 41 is disrupted. The capacitive discharge ignition unit 33 is then unable to deliver electrical power of sufficient voltage to maintain engine operation. While the emergency stop switch 32 is primarily designed to deactivate the engine during emergency situations, many riders regularly stop their snowmobiles through the activation of the emergency stop switch 32.

The emergency stop switch 32 desirably consists of the conventional two position electrical switch which may be configured in a normally opened or closed position. The circuit can be designed so that the emergency stop switch remains in a normally open position.

When either the ignition switch 31 or the emergency stop switch 32 is manually turned off, the engine stops. After stopping the engine, the power from the battery 30 is supplied to the coil 29a of the self-shut relay 29 for a predetermined period, for example, ten minutes, by the operation of the control unit 20, thereby supplying the power to the control unit 20 for that period.

If the engine is restarted within the predetermined period while the engine is warm, the quantity of the fuel injected from the injector 11 is corrected to a proper value, so that restarting the engine in a hot engine condition is ensured. The battery 30 is further connected to the coil of the fuel pump relay and to the injector 11 and the pump through a contact of the relay.

Furthermore, the capacitive discharge ignition unit 33 is provided as an ignition device. The capacitive discharge ignition unit 33 is connected to a primary coil of an ignition coil 4a and to the spark plug 4 through a secondary coil. A signal line of the capacitive discharge ignition unit 33 is connected to the input port of the input/output interface 25 of the control unit 20 for applying the capacitive discharge ignition pulses. When one of the switches 31, 32 is turned off, lines for the capacitive discharge ignition unit 33 are short-circuited to stop the ignition operation.

Electrically connected between the alternator 41 and ECU 20 is an alternator controlled switch (ACS) 50. The ACS 50 is activated by the output of the alternator 41 which results from the rotation of the engine when it is started. When activated, the ACS 50 effects the connection of the battery power to the ECU 20 of the fuel injection system. The ACS 50 is commercially available from Minks Engineering, Kissinnee, Fla., Model No. LR34.

As stated, the output from the alternator 41 resulting from the rotation of the engine effects the connection of the power in the engine to the ECU 20. This eliminates the need for extra actions by the snowmobile operator to start the engine, such as positioning the ignition switch to a "start" position or monitoring a lamp.

The ACS 50 does not need to shorten its output to a momentary power pulse but rather can be "on" the entire time the engine is running as, unlike a manual "run" switch, the ACS 50 will naturally shut off when the engine is not running. This eliminates the need for the ECU 20 to hold its own power while the engine is running.

The engine control system, however, desirably includes an ECU controlled self-hold-on relay 54 that the ECU 20 uses to hold power for a period of time after the engine has stopped running as a means of facilitating the next start up attempt of the engine. As this relay is also on while the engine is running, it can be used as the sole power source for parts of the system, to lower the current passes through the ACS 50. This relay can be eliminated, however, for a system that allows for efficient starting performance without the ECU having to remain active after the engine has stopped.

In the preferred embodiment, the CPU 21 calculates an engine speed from a duration of pulses of the capacitive discharge ignition pulse signals from the capacitive discharge ignition unit 33 in accordance with the control programs stored in the ROM 22. Based upon the engine speed and a throttle valve opening degree from the throttle position sensor 10, a basic fuel injection pulse width can be calculated.

The basic fuel injection pulse width is corrected with various data stored in the RAM 23 so that an actual fuel injection pulse width is calculated. The input/output interface 25 produces a driving signal of the pulse width as a trigger signal of the capacitive discharge ignition pulse signal which is applied to the fuel injector 11 through the driver 40.

In an alternate embodiment, as a self-diagnosis function of the system, a connector 37 for changing a diagnosis mode and a connector 38 for diagnosing the engine are connected to the input ports of the input/output interface 25. A serial monitor 39 is connected to the control unit 20 through the connector 38. The trouble mode changing connector 37 operates to change the self-diagnosis function of the control unit 20 into either a U(user)-check mode or D(dealer)-check mode. In a normal state, the connector 37 is set in the U-check mode. When an abnormality occurs in the system during the driving of the vehicle, trouble data are stored and kept in the backup RAM 24. At a dealer's shop, the serial monitor 39 is connected through the connector 38 to read the data stored in the RAM 24 for diagnosing the trouble of the system. The connector 37 is changed to the D-check mode to diagnose the trouble in more detail.

While a preferred embodiment of the present invention has been described, it should be understood that various changes, adaptations and modifications may be made therein without departing from the spirit of the invention and the scope of the appended claims.

What is claimed is:

1. In a snowmobile engine having a battery, an electronically controlled fuel system, comprising:

fuel injection means including a fuel pump and at least one fuel injector for delivering fuel to the engine;

electronic control unit means electrically connected to the battery for controlling the operation of the fuel injection means and including a plurality of sensors for monitoring the operating parameters of the engine;

an alternator for producing an electrical current in response to the rotation of the engine, the alternator including a source coil and a charge coil and having an electrical output;

an ignition system comprising a capacitive discharge ignition unit in electrical communication with the excitor coil of the alternator, for receiving and storing the current from the alternator;

an emergency engine deactivation means for interrupting the power from the alternator; and control switch means electrically connected to the electrical output of the charge coil of the alternator, to the battery and to the electronic control unit means, for supplying electrical energy from the battery to the electronic control unit means upon detecting electrical current provided by the alternator in response to the rotation of the engine so that power is supplied to the electronic control unit means whenever an operator attempts to start the engine, whether by manually pulling a starter rope or by activating an electric starter.

2. A method of activating the electronic fuel injection system of a snowmobile engine having a battery, fuel injection means for conveying fuel to the engine, an alternator for producing an electrical current in response to the rotation of the engine, electronic control unit means electrically connected to the battery for controlling the operation of the fuel injection means, comprising the steps of:

sensing the electrical output of the alternator;

effecting the supply of energy from the battery to the electronic control unit means whenever an electrical output from the alternator is sensed.

3. In a snowmobile engine having a battery, an electronically controlled fuel system, comprising:

fuel injection means for conveying fuel to the engine;

electronic control unit means electrically connected to the battery for controlling the operation of the fuel injection means;

an alternator for producing an electrical current in response to the rotation of the engine, the alternator having an electrical output; and control switch means electrically connected to the electrical output of the alternator, to the battery and to the electronic control unit means, for supplying electrical energy from the battery to the electronic control unit means upon detecting electrical current provided by the alternator in response to the rotation of the engine so that power is supplied to the electronic control unit means whenever an operator attempts to start the engine, whether by manually pulling a starter rope or by activating an electric starter.

4. The electronically controlled fuel system of claim 3 wherein the alternator includes a source coil an exciter coil and a charge coil, the control switch receiving the electrical output from the charge coil.

5. The electronically controlled fuel system of claim 4 wherein the control switch is electrically connected to the output of the alternator so that the control switch does not need to shorten its output to a momentary power pulse.

6. The electronically controlled fuel system of claim 5 wherein the fuel injection means includes a fuel pump and at least one fuel injector for delivering fuel to the engine.

7. The electronically controlled fuel system of claim 6 wherein the control switch means includes a voltage regulator.

8. The electronically controlled fuel system of claim 7 wherein the electronic control unit means includes a plurality of sensors for monitoring the operating parameters of the engine.

9. The electronically controlled fuel system of claim 4 wherein the engine further includes an ignition system comprising a capacitive discharge ignition unit in electrical communication with the exciter coil of the alternator, for receiving and storing the current from the alternator.

10. The electronically controlled fuel system of claim 9 further comprising an emergency engine deactivation means for interrupting the power from the alternator.

11. The electronically controlled fuel system of claim 10 further including an ignition switch having a run position, the ignition switch being located in the run position before the engine will start.

12. The electronically controlled fuel system of claim 11 wherein the electronic control unit means does not draw significant power from the battery when the engine is not running, thereby allowing the engine to be started in the run position after the engine is stopped by the emergency engine deactivation means.

\* \* \* \* \*